April 23, 1968  W. A. HAMILTON  3,379,290
BRAKE ASSEMBLY
Filed Aug. 30, 1966
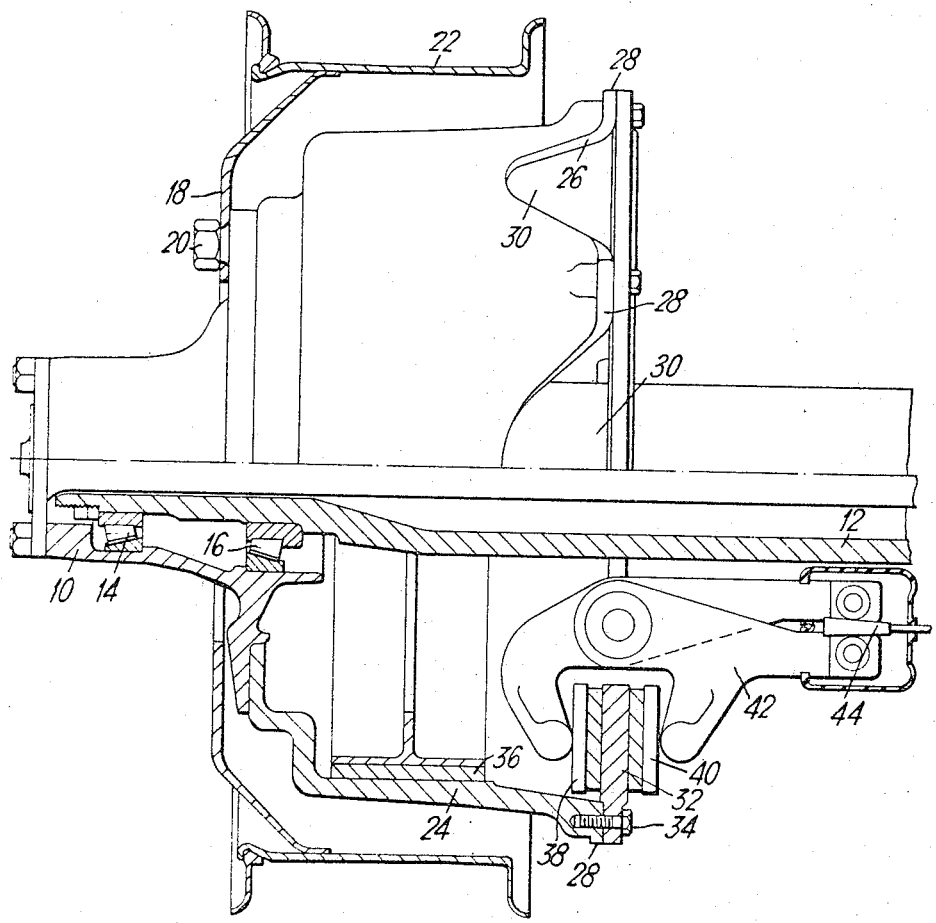
Inventor
William Alexander Hamilton
BY
D. D. McGraw
Attorney

United States Patent Office 3,379,290
Patented Apr. 23, 1968

3,379,290
BRAKE ASSEMBLY
William Alexander Hamilton, Luton, England, assignor to General Motors Corporation, Detroit, Mich., a corporation of Delaware
Filed Aug. 30, 1966, Ser. No. 576,023
Claims priority, application Great Britain, Sept. 10, 1965, 38,695/65
2 Claims. (Cl. 188—218)

ABSTRACT OF THE DISCLOSURE

A brake assembly in which the brake drum is attached at one axial end to the wheel hub, the other axial end of the brake drum having a wave-form edge comprising alternatively arranged projections and apertures with a brake disc attached to the projections of the drum waveform edge. The drum has service brake shoes engaging it and the disc has emergency brake shoes engaging it.

---

This invention relates to combined drum and disc brake assemblies for motor road vehicles.

From one aspect the invention comprises a brake assembly having a brake drum fitted and attached at one end to the wheel hub, and a brake disc fitted and attached to the other end thereof at projections of its wave-form edge.

From another aspect the invention comprises a brake assembly for motor road vehicles, in which one end of a brake drum is connected to a wheel hub, the other end of the brake drum has a wave-form edge comprising alternately arranged projections and apertures, and a brake disc is connected to the projections of the wave-form edge of the brake drum.

The outer surface of the drum is preferably of frustoconical shape; and the wave-form edge preferably projects beyond the edge of the surrounding wheel rim. Thus by virtue of the apertures between the projections, and of the location relative to the wheel rim edge, air-stream cooling is possible not only for the disc but also for the drum.

The wave-form edge may be of sinuous form. Alternatively, however, the wave-form edge could include angular or sub-angular portions, for example to give a crenellated configuration.

From another aspect the invention comprises a motor road vehicle having a service-brake control actuable to bring a first set of brake shoes into engagement with the brake drum of a brake assembly as aforesaid, and also having an emergency-brake control actuable to bring a second set of brake shoes into engagement with the brake disc of the brake assembly.

The brake shoes can be actuated directly by manual or pedal operation; or indirectly through the intermediary of air or hydraulically operated servo devices. The actual mechanisms are conveniently of orthodix construction.

The appended claims define the scope of the invention claimed. The invention and how it can be performed are hereinafter particularly described with reference to the accompanying drawing, which is an axial section, with some parts in elevtaion, of one embodiment of a combined drum and disc brake assembly according to the invention.

In the embodiment of the brake assembly shown in the drawing, a wheel hub 10 is rotatably mounted at the outer end of an axle 12 by a pair of tapered roller thrust bearings 14 and 16. A wheel rim member is carried by the wheel hub 10: the wheel rim member comprises a wheel disc 18 which is attached to the hub by screw bolts 20, and a wheel rim 22 carried by the wheel disc.

One end of a brake drum 24 is connected to a flange of the wheel hub by means of the aforesaid screw bolts 20, and is a fit in a correspondingly shaped portion of the wheel hub. The brake drum 24 is thus coaxially surrounded by the wheel rim 22; however, the edge 26 of the other end of the brake drum, namely the axially inner edge of the brake drum as mounted in a vehicle, projects beyond the inner edge of the wheel rim and is consequently in the air stream when the vehicle is moving.

The inner edge 26 of the brake drum is not of simple circular form but is of sinuous wave-form comprising alternately arranged projections 28 and apertures 30. A brake disc 32 is attached at its outer edge by screw bolts 34 to the projections 28 of the inner edge of the brake drum. Thus between the disc and the drum there is a series of circumferentially arranged apertures 30 through which the stream of air can flow.

The brake drum has internally expandable brake shoes 36, operable by a conventional hydraulic cylinder (not shown). The brake disc is associated with opposed shoes 38 and 40 operable by means of conventional hydraulic cylinders (not shown) through the intermediary of a simple form of caliper device 42 which is mounted on an axle casing (not shown) and is operated by a wedge actuator 44.

Cooling is effected both internally and externally of the drum by the air stream flowing respectively in and out of the drum apertures 30, and between the drum 24 and the wheel rim 22.

The drum shoes 36 are operable by a conventional pedal (not shown) which forms a service-brake control allowing the drum to be used for normal brake operation. The disc shoes are operable by a hand lever (not shown) which forms an emergency-brake control in which the disc shoes are independent of the drum shoes, so that the disc brake can be operated in an emergency either to supplement or to replace the drum brake. The disc brake can also be used as a parking brake. Because the disc brake is not used for ordinary service-brake operation, it remains relatively cool for efficient operation when required. Heat conduction from the drum to the disc is relatively small, because of the good cooling and also because the drum and disc are in contact only at the projections of the wave-form edge of the drum.

Converse arrangements of brake shoes and drum can alternatively be made: for example the shoes could be externally of the drum. Also, the disc could be mounted to extend outwardly instead of inwardly of the edge of the drum.

I claim:
1. A brake assembly comprising a brake drum, a wheel hub, attachment means connecting one end of the brake drum to the wheel hub, a brake disc, the other end of the brake drum having a wave-form edge comprising alternately arranged axially extending projections and apertures, and attachment means connecting the brake disc to the projections of the wave-form edge of the brake drum.

2. A brake assembly according to claim 1, wherein a wheel rim member coaxially surrounds part of the brake drum and is connected to the said one end of the brake drum and the wave-form edge at the said other end of the brake drum projects beyond an edge of the surrounding wheel rim member.

References Cited

UNITED STATES PATENTS

| 1,928,079 | 9/1933 | Taylor | 188—218 |
| 1,972,251 | 9/1934 | Udale | 188—264 X |
| 3,051,271 | 8/1962 | Spannagel et al. | 188—70 X |
| 3,184,003 | 5/1965 | Kershner | 188—72 X |

DUANE A. REGER, *Primary Examiner.*